US012752566B2

(12) United States Patent
(10) Patent No.: US 12,752,566 B2
(45) Date of Patent: Oct. 6, 2026

Moriguchi et al.

(54) INK JET RECORDING METHOD, INK JET RECORDING APPARATUS AND AQUEOUS INK

(71) Applicant: CANON KABUSHIKI KAISHA, Tokyo (JP)

(72) Inventors: Takuto Moriguchi, Kanagawa (JP); Osamu Yoshitake, Chiba (JP); Shin-Ichi Sato, Kanagawa (JP); Shoei Moribe, Kanagawa (JP); Ryosuke Otani, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 134 days.

(21) Appl. No.: 18/815,276

(22) Filed: Aug. 26, 2024

(65) Prior Publication Data

US 2025/0083465 A1 Mar. 13, 2025

(30) Foreign Application Priority Data

Aug. 30, 2023 (JP) ................................ 2023-139404
Aug. 8, 2024 (JP) ................................ 2024-131738

(51) Int. Cl.

| | |
|---|---|
| ***G03G 13/20*** | (2006.01) |
| ***B41J 11/00*** | (2006.01) |
| ***B41M 7/00*** | (2006.01) |
| ***C09D 11/322*** | (2014.01) |

(52) U.S. Cl.

CPC .......... *B41M 7/009* (2013.01); *B41J 11/0024* (2021.01); *C09D 11/322* (2013.01)

(58) Field of Classification Search

CPC ... B41M 7/009; B41J 11/0024; C09D 11/322; G03G 13/20; G03G 2215/00413

See application file for complete search history.

(56) References Cited

U.S. PATENT DOCUMENTS 10,647,144 B2 * 5/2020 Koitabashi ............... B41M 7/00
2024/0174001 A1 * 5/2024 Yumoto ............... B41J 11/0022

FOREIGN PATENT DOCUMENTS

EP 2228223 * 9/2010 ............. B41J 11/00
JP 2010188624 A 9/2010

* cited by examiner

*Primary Examiner* — Kristal Feggins

(74) *Attorney, Agent, or Firm* — Canon U.S.A., Inc. IP Division

(57) ABSTRACT

There is provided an ink jet recording method including an ink applying step, a drying step and a fixing step. An aqueous ink contains a resin particle and a wax particle. The glass transition temperature ($T_g$(° C.)) of the resin particle, the melting point ($T_m$) of the wax particle and the surface temperature ($T_d$(° C.)) of the recording medium heated in the drying step satisfy the relationship of the following formula (1):

$$T_m > \frac{\sqrt{\lambda_{CH}C_{CH}} \times T_{CH} + \sqrt{\lambda_{paper}C_{paper}} \times T_{paper}}{\sqrt{\lambda_{CH}C_{CH}} + \sqrt{\lambda_{paper}C_{paper}}} \geq T_g > T_d. \quad \text{formula (1)}$$

6 Claims, 5 Drawing Sheets

INK JET RECORDING METHOD, INK JET RECORDING APPARATUS AND AQUEOUS INK

BACKGROUND OF THE INVENTION

Field of the Invention

The present disclosure relates to an ink jet recording method, an ink jet recording apparatus and an aqueous ink.

Description of the Related Art

In an ink jet recording method, an image is formed by directly or indirectly applying an ink containing a coloring material onto a recording medium such as paper.

At this time, cockling may occur due to excessive absorption of a liquid component in the ink by the recording medium. To quickly remove the liquid components in the ink, a method is known in which a drying device is used to dry the recording medium with warm air or infrared rays.

There has been reported a method for recording an image by applying an ink containing a resin particle to a recording medium and fixing the recording medium with a fixing device to form a film of the resin particle contained in the ink on the recording medium. When this method is used, the fastness of the recorded image can be improved by forming the resin particle into a film.

Japanese Patent Laid-Open No. 2010-188624 discloses an ink jet recording method in which a drying device and a fixing device are combined as described above.

SUMMARY OF THE INVENTION

The present disclosure is directed to providing an ink jet recording method by which an image having excellent fastness can be recorded while the cockling of an ink-absorbent recording medium is inhibited. The present disclosure is also directed to providing an ink jet recording apparatus and an aqueous ink for use in the ink jet recording method.

One disclosed aspect of the embodiments is directed to providing an ink jet recording method including an ink applying step of applying an aqueous ink to an ink-absorbent recording medium by discharging the aqueous ink from an ink jet recording head, a drying step of subjecting the recording medium to which the aqueous ink has been applied to non-contact heating to dry the aqueous ink and a fixing step of fixing the aqueous ink on the recording medium by bringing the recording medium after the drying step into contact with a fixing member to heat the aqueous ink. The aqueous ink contains a resin particle and a wax particle. The glass transition temperature ($T_g$(° C.)) of the resin particle, the melting point ($T_m$) of the wax particle and the surface temperature ($T_d$(° C.)) of the recording medium heated in the drying step satisfy the relationship of the following formula (1):

$$T_m > \frac{\sqrt{\lambda_{CH} C_{CH}} \times T_{CH} + \sqrt{\lambda_{paper} C_{paper}} \times T_{paper}}{\sqrt{\lambda_{CH} C_{CH}} + \sqrt{\lambda_{paper} C_{paper}}} \geq T_g > T_d \quad \text{formula (1)}$$

where in formula (1), λCH is the thermal conductivity (W/m·K) of the fixing member, $C_{CH}$ is the thermal capacity (J/m$^3$·K) of the fixing member, $T_{CH}$ is the surface temperature (° C.) of the fixing member immediately before the fixing member comes into contact with the recording medium, $\lambda_{paper}$ is the thermal conductivity (W/m·K) of the recording medium, $C_{paper}$ is the thermal capacity (J/m$^3$·K) of the recording medium and $T_{paper}$ is the surface temperature (° C.) of the recording medium immediately before the recording medium comes into contact with the fixing member.

Further features of the present disclosure will become apparent from the following description of exemplary embodiments with reference to the attached drawings.

DESCRIPTION OF THE EMBODIMENTS

Figure 1:
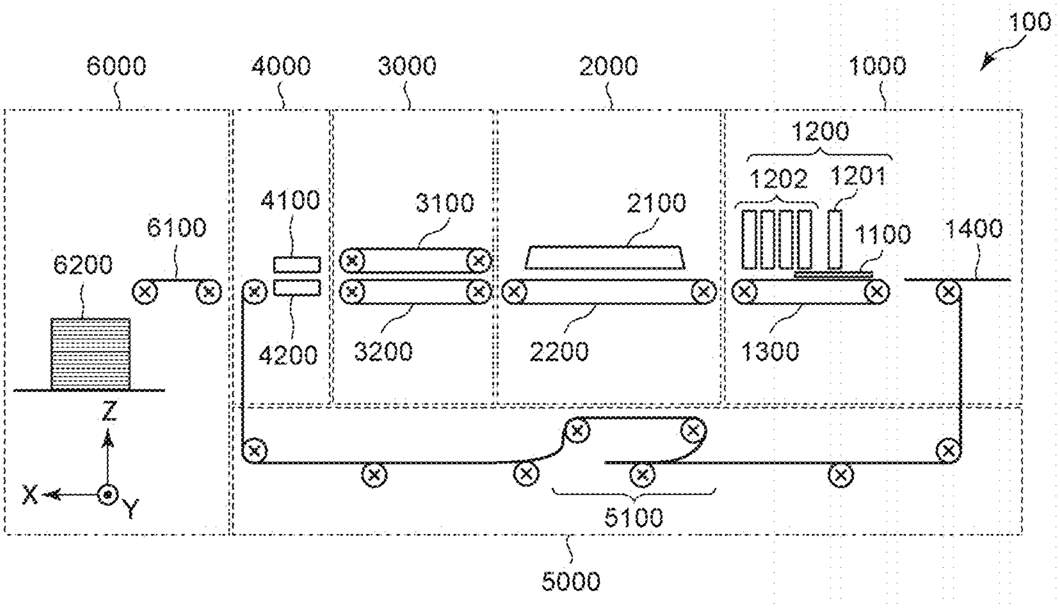
FIG. 1 is a schematic view illustrating an ink jet recording apparatus according to an embodiment of the present disclosure.

It has been found that in the ink jet recording method using the combination of the drying device and the fixing device described in Japanese Patent Laid-Open No. 2010-188624, when heating is performed to a temperature higher than or equal to the glass transition temperature of the resin particle during heat drying, the resin particle is formed into a film; thus, water and a solvent in an ink remain in the ink constituting an image, disadvantageously reducing the fastness of the image.

It has also been found that when the ink is heated to a temperature higher than or equal to the melting point of the wax particle during fixing by contact heating, the wax particle is melted to move easily, and thus the wax particle is less likely to be present on the surface of an image formed of the ink, thereby deteriorating the fastness of the image.

The inventors have conducted intensive studies on an ink jet recording method by which an image having excellent fastness can be recorded while the cockling of an ink-absorbent recording medium is inhibited, and an ink jet recording apparatus and an aqueous ink for use in the ink jet recording method, and have arrived at the present disclosure.

The present disclosure will be described in more detail below with reference to embodiments. In an embodiment of the present disclosure, when a compound is a salt, the salt in an ink is present in the form of dissociated ions. However, for convenience, it is referred to as "the ink contains the salt". An aqueous ink and a reaction liquid for ink jet recording are also referred to simply as an "ink" and a "reaction liquid", respectively. Unless otherwise specified, physical property values are values at room temperature (25° C.). The term "(meth)acrylic acid" refers to "acrylic acid" and "methacrylic acid". The term "(meth)acrylate" refers to "acrylate" and "methacrylate".

The inventors have conducted studies on a method for recording an image having excellent fastness while the cockling of an ink-absorbent recording medium is inhibited. The results have led the inventors to speculate that it is important to reduce the amount of a liquid component in an ink in a drying step and to make it difficult to melt a wax particle in a fixing step after the drying step. To this end, the inventors have found that it is effective to satisfy the requirement of the following formula (1):

$$T_m > \frac{\sqrt{\lambda_{CH}C_{CH}} \times T_{CH} + \sqrt{\lambda_{paper}C_{paper}} \times T_{paper}}{\sqrt{\lambda_{CH}C_{CH}} + \sqrt{\lambda_{paper}C_{paper}}} \geq T_g > T_d. \quad \text{formula (1)}$$

When the surface temperature $T_d$ of the recording medium heated in the drying step is lower than the glass transition temperature $T_g$ of the resin particle, it is possible to promote evaporation of the liquid component such as water in the ink and permeation into the recording medium. Thereby, the amount of the liquid component in the image formed of the ink is reduced, and thus the fastness of the image can be improved.

In the fixing step after the drying step, the recording medium is brought into contact with a fixing member to heat the aqueous ink, thereby fixing the aqueous ink to the recording medium. In this case, the fixing member and the recording medium used satisfy the above formula (1). The temperature of the aqueous ink heated in the fixing step is substantially identical to the temperature of the contact surface between the fixing member and the recording medium. The temperature of the contact surface between the fixing member and the recording medium can be calculated from the surface temperatures, thermal conductivity, and thermal capacity of the two objects just before they come into contact to each other, as described in Reference 1 ("Japan Society of Mechanical Engineers, Heat-Transfer Engineering, Maruzen Co., Ltd., 2005, page 43). Specifically, the temperature of the contact surface can be calculated by the following formula (1-1):

$$\frac{\sqrt{\lambda_{CH}C_{CH}} \times T_{CH} + \sqrt{\lambda_{paper}C_{paper}} \times T_{paper}}{\sqrt{\lambda_{CH}C_{CH}} + \sqrt{\lambda_{paper}C_{paper}}} \quad \text{formula (1-1)}$$

where in formula (1-1), $\lambda_{CH}$ is the thermal conductivity (W/m·K) of the fixing member, $C_{CH}$ is the thermal capacity (J/m$^3$·K) of the fixing member, $T_{CH}$ is the surface temperature (° C.) of the fixing member immediately before the fixing member comes into contact with the recording medium, $\lambda_{paper}$ is the thermal conductivity (W/m·K) of the recording medium, $C_{paper}$ is the thermal capacity (J/m$^3$·K) of the recording medium and $T_{paper}$ is the surface temperature (° C.) of the recording medium immediately before the recording medium comes into contact with the fixing member.

When the fixing member and the recording medium that satisfy formula (1) are used, the aqueous ink is fixed in the fixing step by heating the aqueous ink to a temperature higher than or equal to the glass transition temperature $T_g$ of the resin particle. Thus, the resin particle is melted and formed into a film, improving the fastness of the image.

In the fixing step, the aqueous ink is heated and fixed at a temperature lower than the melting point of the wax particle. In this case, the wax particle is exposed to the surface of the image without melting. This reduces the surface energy of the image and the friction coefficient of the image surface, thereby improving the fastness of the image.

Ink Jet Recording Method, Ink Jet Recording Apparatus and Aqueous Ink

An ink jet recording method according to an embodiment of the present disclosure (hereafter, also referred to simply as a "recording method") is an ink jet recording method including an ink applying step, a drying step and a fixing step. The ink applying step is a step of applying an aqueous ink to an ink-absorbent recording medium by discharging the aqueous ink from an ink jet recording head. The drying step is a step of subjecting the recording medium to which the aqueous ink has been applied to non-contact heating to dry the aqueous ink. The fixing step is a step of fixing the aqueous ink on the recording medium by bringing the recording medium after the drying step into contact with a fixing member to heat the aqueous ink. The aqueous ink contains a resin particle and a wax particle. The glass transition temperature ($T_g$(° C.)) of the resin particle, the melting point ($T_m$) of the wax particle and the surface temperature ($T_d$(° C.)) of the recording medium heated in the drying step satisfy the relationship of the following formula (1):

$$T_m > \frac{\sqrt{\lambda_{CH}C_{CH}} \times T_{CH} + \sqrt{\lambda_{paper}C_{paper}} \times T_{paper}}{\sqrt{\lambda_{CH}C_{CH}} + \sqrt{\lambda_{paper}C_{paper}}} \geq T_g > T_d \quad \text{formula (1)}$$

where in formula (1), $\lambda_{CH}$ is the thermal conductivity (W/m·K) of the fixing member, $C_{CH}$ is the thermal capacity (J/m$^3$·K) of the fixing member, $T_{CH}$ is the surface temperature (° C.) of the fixing member immediately before the fixing member comes into contact with the recording medium, $\lambda_{paper}$ is the thermal conductivity (W/m·K) of the recording medium, $C_{paper}$ is the thermal capacity (J/m$^3$·K) of the recording medium and $T_{paper}$ is the surface temperature (° C.) of the recording medium immediately before the recording medium comes into contact with the fixing member.

The ink jet recording apparatus according to an embodiment of the present disclosure (hereinafter, also referred to simply as a "recording apparatus") is an ink jet recording apparatus for use in an ink jet recording method including an ink applying step, a drying step and a fixing step. The ink applying step is a step of applying an aqueous ink to an ink-absorbent recording medium by discharging the aqueous ink from an ink jet recording head. The drying step is a step of subjecting the recording medium to which the aqueous ink has been applied to non-contact heating to dry the aqueous ink.

The fixing step is a step of fixing the aqueous ink on the recording medium by bringing the recording medium after the drying step into contact with a fixing member to heat the aqueous ink. The aqueous ink contains a resin particle and a wax particle. The glass transition temperature ($T_g$(° C.)) of the resin particle, the melting point ($T_m$) of the wax particle and the surface temperature ($T_d$(° C.)) of the recording medium heated in the drying step satisfy the relationship of the following formula (1):

$$T_m > \frac{\sqrt{\lambda_{CH}C_{CH}} \times T_{CH} + \sqrt{\lambda_{paper}C_{paper}} \times T_{paper}}{\sqrt{\lambda_{CH}C_{CH}} + \sqrt{\lambda_{paper}C_{paper}}} \geq T_g > T_d \quad \text{formula (1)}$$

where in formula (1), $\lambda_{CH}$ is the thermal conductivity (W/m·K) of the fixing member, $C_{CH}$ is the thermal capacity (J/m$^3$·K) of the fixing member, $T_{CH}$ is the surface temperature (° C.) of the fixing member immediately before the fixing member comes into contact with the recording medium, $\lambda_{paper}$ is the thermal conductivity (W/m·K) of the recording medium, $C_{paper}$ is the thermal capacity (J/m$^3$·K) of the recording medium and $T_{paper}$ is the surface temperature (° C.) of the recording medium immediately before the recording medium comes into contact with the fixing member.

An aqueous ink according to an embodiment of the present disclosure (hereinafter, also referred to simply as an "ink") is an aqueous ink for use in an ink jet recording method including an ink applying step, a drying step and a fixing step. The ink applying step is a step of applying an aqueous ink to an ink-absorbent recording medium by discharging the aqueous ink from an ink jet recording head. The drying step is a step of subjecting the recording medium to which the aqueous ink has been applied to non-contact heating to dry the aqueous ink. The fixing step is a step of fixing the aqueous ink on the recording medium by bringing the recording medium after the drying step into contact with a fixing member to heat the aqueous ink. The aqueous ink contains a resin particle and a wax particle. The glass transition temperature ($T_g$(° C.)) of the resin particle, the melting point ($T_m$) of the wax particle and the surface temperature ($T_d$(° C.)) of the recording medium heated in the drying step satisfy the relationship of the following formula (1):

$$T_m > \frac{\sqrt{\lambda_{CH}C_{CH}} \times T_{CH} + \sqrt{\lambda_{paper}C_{paper}} \times T_{paper}}{\sqrt{\lambda_{CH}C_{CH}} + \sqrt{\lambda_{paper}C_{paper}}} \geq T_g > T_d \quad \text{formula (1)}$$

where in formula (1), $\lambda_{CH}$ is the thermal conductivity (W/m·K) of the fixing member, $C_{CH}$ is the thermal capacity (J/m$^3$·K) of the fixing member, $T_{CH}$ is the surface temperature (° C.) of the fixing member immediately before the fixing member comes into contact with the recording medium, $\lambda_{paper}$ is the thermal conductivity (W/m·K) of the recording medium, $C_{paper}$ is the thermal capacity (J/m$^3$·K) of the recording medium and $T_{paper}$ is the surface temperature (° C.) of the recording medium immediately before the recording medium comes into contact with the fixing member.

Ink Jet Recording Apparatus

An ink jet recording apparatus will be described in detail below with reference to the drawings. FIG. 1 is a schematic view illustrating an ink jet recording apparatus according to an embodiment of the present disclosure. The ink jet recording apparatus according to the present embodiment is an ink jet recording apparatus that records an image on a recording medium using an ink and a reaction liquid containing a reactant that reacts with the ink. An X-direction, a Y-direction and a Z-direction represent the width direction (total length direction), depth direction and height direction of the ink jet recording apparatus, respectively. The recording medium is conveyed in the X-direction.

An ink jet recording apparatus 100 of the present embodiment illustrated in FIG. 1 includes a recording portion 1000, a heating portion 2000, a fixing portion 3000, a cooling portion 4000, a reversing portion 5000 and a sheet delivery portion 6000. In the recording portion 1000, various liquids are applied to a recording medium 1100, which has been conveyed from a sheet feeding device 1400 by a conveying member 1300, by a liquid applying device 1200. In the heating portion 2000, the liquids applied to the recording medium 1100 are heated by a heating device 2100 to evaporate volatile components, such as water, in the liquids, thereby performing drying. In the fixing portion 3000, a fixing member 3100 is brought into contact with the region of the recording medium 1100, to which the liquids have been applied, to heat the region, to thereby promote the fixation of an image to the recording medium 1100. The recording medium 1100 is then cooled by the cooling member 4100 of the cooling portion 4000. When an image is to be recorded on the rear surface of the recording medium subsequently to the front surface (recording surface) thereof, first, the recording medium 1100 is reversed by the reversing device 5100 of the reversing portion 5000. After the image is recorded on the rear surface as in the case of the front surface, the recording medium is conveyed by the conveying member 6100 of the sheet delivery portion 6000 and stacked and stored in a recording medium storage portion 6200.

In the recording method and the recording apparatus according to an embodiment of the present disclosure, an ink-absorbent recording medium is used. The ink-absorbent recording medium is a recording medium in which the amount of water absorbed from the start of contact to 30 msec$^{1/2}$ is 5 mL/m$^2$ or more in the Bristow method described in "Liquid Absorbent Test Method for Paper and Paperboard" of JAPAN TAPPI Paper and Pulp Test Method No. 51. In an embodiment of the present disclosure, a recording medium satisfying the requirement of the amount of water absorbed is defined as an "ink-absorbent recording medium". In a recording medium composed of a resin, such as polyethylene terephthalate (PET) or polyvinyl chloride, the amount of water absorbed is less than 5 mL/m$^2$. Such a recording medium is a non-ink-absorbent or poor-ink-absorbent recording medium.

As a recording medium 1100, a recording medium having ink absorbency (permeability) is used in which the amount of water absorbed from the start of contact to 30 msec$^{1/2}$ is 5 mL/m$^2$ or more. Also, the amount of water absorbed from the start of contact to 30 msec$^{1/2}$ is preferably more than 10 mL/m$^2$. Examples of a recording medium that can be used as a recording media having ink absorbency (permeability) include a recording medium that does not have a coating layer, such as plain paper, uncoated paper or synthetic paper; and a recording medium (coated paper) that have a coating layer, such as printing paper, glossy paper or art paper. As long as the coating layer has ink absorbency (permeability), the substrate of the recording medium may be a film or sheet composed of a resin or paper provided with a resin layer (so-called resin-coated paper). The basis weight (g/m$^2$) of the recording medium 1100 is preferably 30 g/m$^2$ or more to 500 g/m$^2$ or less, more preferably 50 g/m$^2$ or more to 450 g/m$^2$ or less.

Recording Portion

The recording portion 1000 includes the liquid applying device 1200. The liquid applying device 1200 includes a reaction liquid applying device 1201 and an ink applying device 1202. The reaction liquid applying device 1201 illustrated in FIG. 1 is an example of a unit including an ink jet discharge head. The reaction liquid applying device may also be constituted by utilizing a gravure coater, an offset coater, a die coater, a blade coater or the like. The reaction liquid may be applied by the reaction liquid applying device 1201 before or after the application of the ink as long as the liquid can be brought into contact with the ink on the recording medium 1100. However, to record high-quality images on various recording media having different liquid-absorbing characteristics, the reaction liquid can be applied before the application of the ink. An ink jet discharge head (recording head) is used as the ink applying device 1202. Examples of the discharge system of the discharge head serving as the liquid applying device 1200 include a system including causing film boiling in a liquid with an electrothermal converter to form an air bubble, to thereby discharge the liquid; and a system including discharging the liquid with an electromechanical transducer.

The liquid applying device 1200 is a line head arranged in the Y-direction in an extended manner, and its discharge ports are arrayed in a range covering the image recording region of the recording medium having the maximum usable width. The discharge head has a discharge port surface 1207 (FIG. 3) including a discharge port on its lower side, which is adjacent to the recording medium 1100. The discharge port surface faces the recording medium 1100 with a minute distance of about several millimeters therebetween.

Multiple ink applying devices 1202 may be arranged for applying inks of respective colors to the recording medium 1100. For example, when respective color images are recorded with a yellow ink, a magenta ink, a cyan ink and a black ink, the four ink applying devices 1202 that discharge the above-mentioned four types of inks are arranged side by side in the X-direction. The ink and the reaction liquid are hereinafter sometimes collectively referred to as "liquids".

The thickness of the ink applied to the recording medium can be 10 μm or less.

Figure 2:
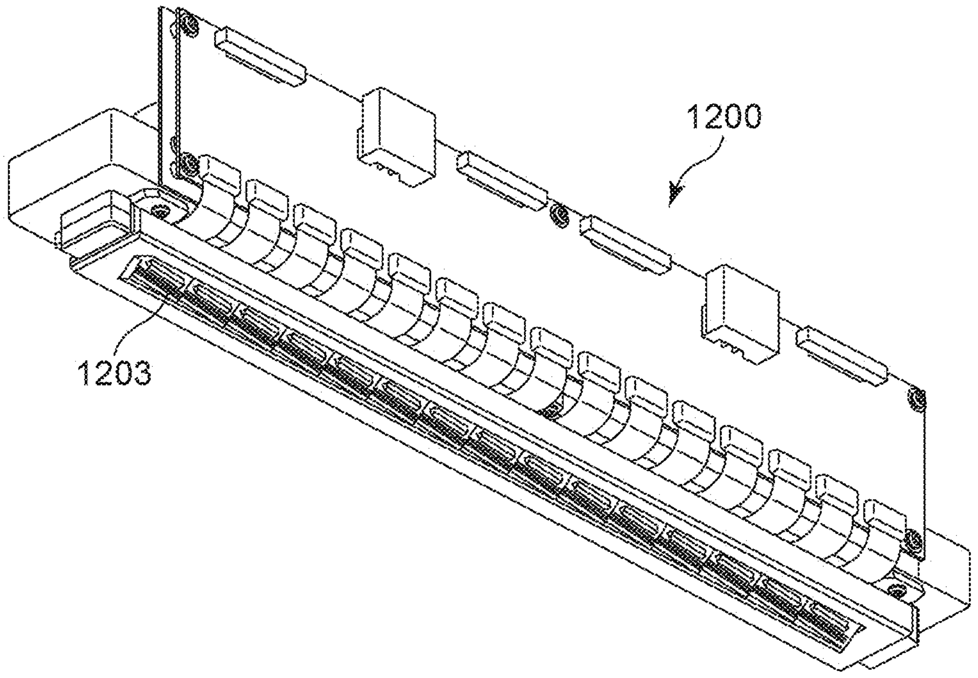
FIG. 2 is a perspective view illustrating an example of a liquid applying device.

FIG. 2 is a perspective view illustrating an example of the liquid applying device. The liquid applying device 1200 illustrated in FIG. 2 is a line head. The line head includes multiple discharge element substrates 1203 that have discharge port arrays and that are linearly arranged. In each of the discharge element substrates 1203, the multiple discharge port arrays are arranged.

Figure 3:
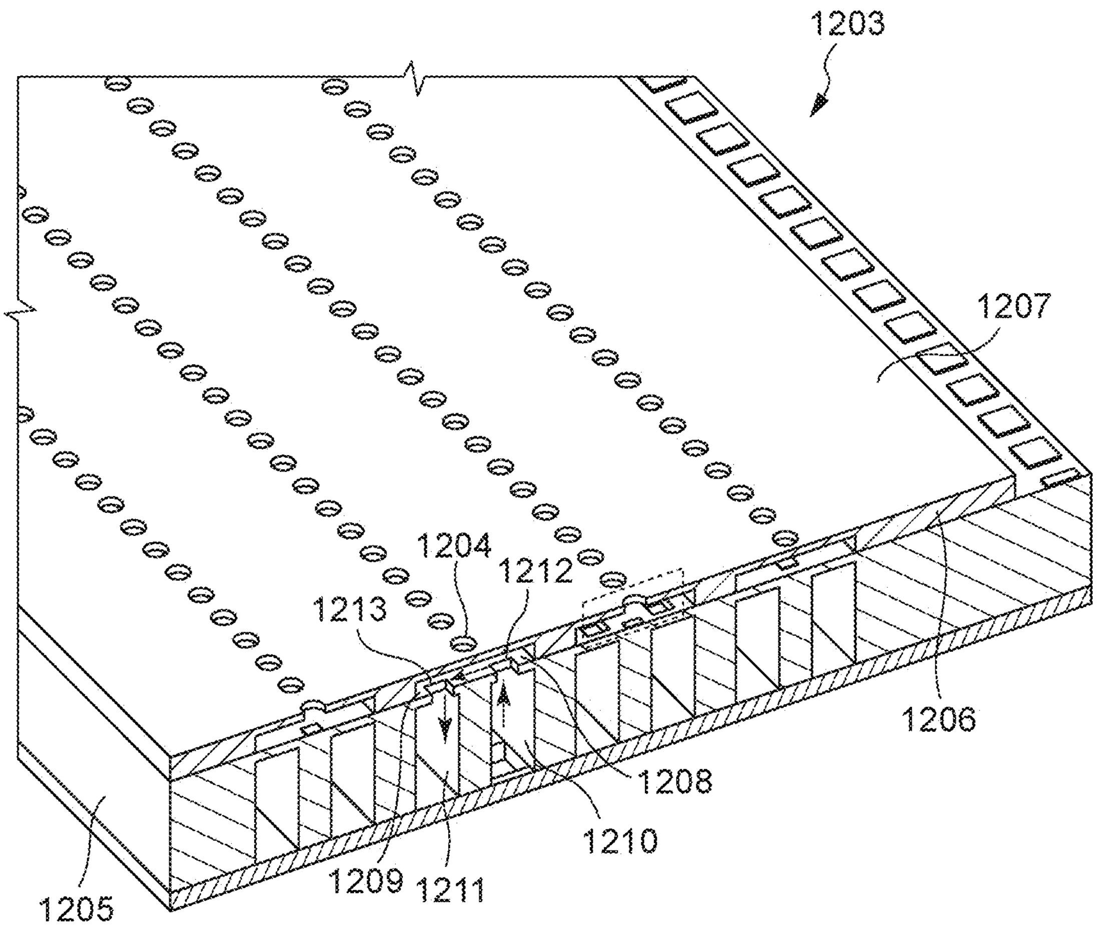
FIG. 3 is a sectional perspective view illustrating an example of a discharge element substrate.
Figure 4:
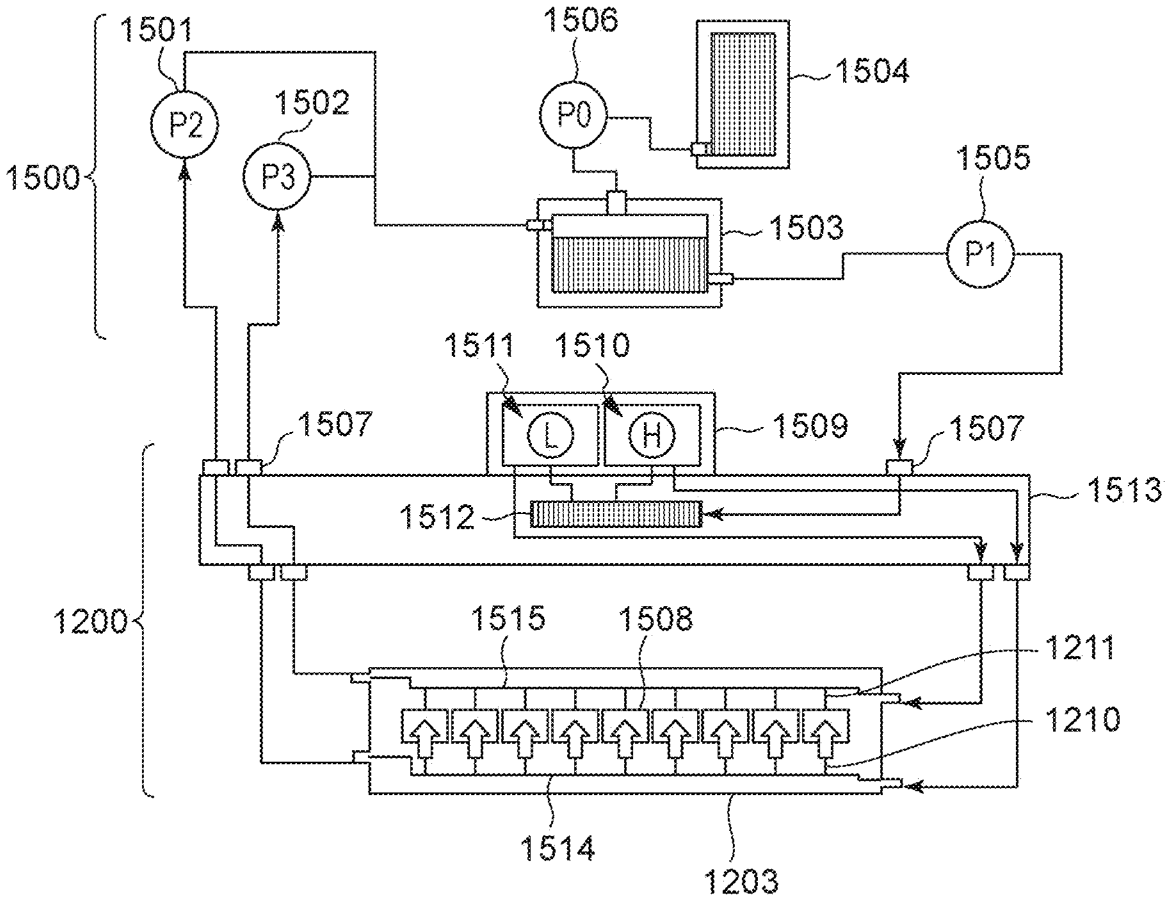
FIG. 4 is a schematic view illustrating an example of a liquid supply system.

FIG. 3 is a sectional perspective view illustrating an example of each of the discharge element substrates. The discharge element substrate 1203 illustrated in FIG. 3 includes a discharge port forming member 1206 having a discharge port 1204 opened, and a substrate 1205 having a discharge element (not illustrated) arranged thereon. The lamination of the discharge port forming member 1206 and the substrate 1205 forms a first flow path 1208 and a second flow path 1209 through which a liquid flows. The first flow path 1208 is a region from an inflow port 1212, into which the liquid flows from an inflow path 1210, to a portion between each of the discharge ports 1204 and a corresponding one of the discharge elements (FIG. 4, a liquid chamber 1508). The second flow path 1209 is a region from the portion between the discharge port 1204 and the discharge element (FIG. 4, the liquid chamber 1508) to an outflow port 1213 from which the liquid flows out to an outflow path 1211. For example, if a pressure difference is provided between the inflow port 1212 and the outflow port 1213, such as the inflow port 1212 having a high pressure and the outflow port 1213 having a low pressure, the liquid can be allowed to flow from the higher-pressure side to the lower-pressure side (in the direction of the arrow in FIG. 3). The liquid passed through the inflow path 1210 and the inflow port 1212 enters the first flow path 1208. The liquid passed through the portion between the discharge port 1204 and the discharge element (FIG. 4, the liquid chamber 1508) flows to the outflow path 1211 through the second flow path 1209 and the outflow port 1213.

Supply System

FIG. 4 is a schematic view illustrating an example of a supply system for a liquid such as an ink. A supply portion 1500 of the liquid applying device 1200 illustrated in FIG. 4 includes a first circulation pump (high-pressure side) 1501, a first circulation pump (low-pressure side) 1502, a sub tank 1503, and a second circulation pump 1505. The sub tank 1503 connected to a main tank 1504 serving as a liquid storage portion has an air communication port (not illustrated) and hence can discharge air bubbles mixed into a liquid to the outside of a circulation system. The sub tank 1503 is also connected to a replenishment pump 1506. A liquid is consumed in the liquid applying device 1200 by the discharge (ejection) of the liquid from a discharge port in, for example, image recording or suction recovery. The replenishment pump 1506 transfers the liquid from the main tank 1504 to the sub tank 1503 in an amount corresponding to the amount consumed.

The first circulation pump (high-pressure side) 1501 and the first circulation pump (low-pressure side) 1502 allows the liquid in the liquid applying device 1200, which has been caused to flow out from a connection portion (inflow portion) 1507, to flow to the sub tank 1503. A positive-displacement pump having a quantitative liquid-delivering ability can be used as each of the first circulation pump (high-pressure side) 1501, the first circulation pump (low-pressure side) 1502 and the second circulation pump 1505. Examples of such positive-displacement pump include a tube pump, a gear pump, a diaphragm pump and a syringe pump. At the time of the driving of each of the discharge element substrates 1203, the liquid can be allowed to flow from a common inflow path 1514 to a common outflow path 1515 by the first circulation pump (high-pressure side) 1501 and the first circulation pump (low-pressure side) 1502.

A negative pressure control unit 1509 includes two pressure adjusting mechanisms in which control pressures different from each other are set. A pressure adjusting mechanism (high-pressure side) 1510 and a pressure adjusting mechanism (low-pressure side) 1511 are connected to the common inflow path 1514 and the common outflow path 1515, respectively, in the discharge element substrate 1203 through a supply unit 1513 having arranged therein a filter 1512 that removes foreign matter from a liquid. The discharge element substrate 1203 includes the common inflow path 1514, the common outflow path 1515, and the inflow path 1210 and the outflow path 1211 that communicate with the liquid chamber 1508 serving as the portion between the discharge port 1204 and the discharge element (not illustrated). The inflow path 1210 and the outflow path 1211 communicate with the common inflow path 1514 and the common outflow path 1515, respectively. Accordingly, a flow (arrow in FIG. 4) occurs in which part of the liquid passes the inside of the liquid chamber 1508 from the common inflow path 1514 to flow to the common outflow path 1515. The arrows in FIG. 3 indicate the flow of the liquid in the liquid chamber 1508. That is, as illustrated in FIG. 3, the liquid in the first flow path 1208 flows to the second flow path 1209 through a portion between the discharge port 1204 and the discharge element.

As illustrated in FIG. 4, the pressure adjusting mechanism (high-pressure side) 1510 is connected to the common inflow path 1514, and the pressure adjusting mechanism (low-pressure side) 1511 is connected to the common outflow path 1515. Accordingly, a pressure difference is provided between the inflow path 1210 and the outflow path 1211. Thus, a pressure difference is also provided between the inflow port 1212 (FIG. 3) communicating with the inflow path 1210 and the outflow port 1213 (FIG. 3) communicating with the outflow path 1211. When a liquid is allowed to flow by the pressure difference between the inflow port 1212 and the outflow port 1213, the flow rate (mm/s) of the liquid can be controlled to 0.1 mm/s or more to 10.0 mm/s or less.

Conveyance System

As illustrated in FIG. 1, the recording portion 1000 includes the liquid applying device 1200 and the conveying member 1300 that conveys the recording medium 1100. The reaction liquid and the ink are applied to the desired positions of the recording medium 1100, which is conveyed by the conveying member 1300, by the liquid applying device 1200. The respective liquid applying devices 1200 receive the image signal of recording data to apply the required reaction liquid and ink to the respective positions. Although the conveying member 1300 in the form of a conveying belt is illustrated in FIG. 1, for example, a spur or a conveying cylinder may be used as long as the spur or the conveying cylinder has a function of conveying the recording medium 1100. To improve conveyance accuracy, a member that can fix the recording medium 1100 can be used as the conveying member 1300. Specific examples thereof include a technique including arranging holes in the conveying member 1300 and suctioning the recording medium 1100 from its rear surface side to fix the recording medium; and a technique including forming the conveying member 1300 from an appropriate material and electrostatically adsorbing the recording medium 1100 to fix the recording medium.

Heating Portion

As illustrated in FIG. 1, the heating portion 2000 includes a heating device 2100 and a conveying member 2200. The recording medium 1100 to which the reaction liquid and the ink have been applied and on which an image has been recorded is heated by the heating device 2100 while being conveyed by the conveying member 2200, thereby evaporating the liquid component of the image to dry the image. The recording method further includes, between an ink applying step and a fixing step, a drying step of subjecting the recording medium to which the ink has been applied to non-contact heating to dry the ink. When the drying step is included, the deformation (cockling or curl) of the recording medium 1100 can be effectively inhibited.

The heating device 2100 may have any configuration as long as the device can heat the recording medium 1100. Various devices used in the art, such as a warm-air dryer and a heater, may each be used. Of these, a non-contact heater, such as a heating wire or an infrared heater, can be used in terms of safety and energy efficiency. To jet a heated gas to the recording medium 1100, the use of a mechanism for blowing a warm gas with a built-in fan easily improves the drying efficiency.

With regard to a method for the heating, the recording medium 1100 may be heated from the side of a surface (recording surface (front surface)) to which the reaction liquid and the ink have been applied, may be heated from its rear surface side or may be heated from both the surfaces. The conveying member 2200 may have a heating function. Although the conveying member 2200 using a conveying belt is illustrated in FIG. 1, for example, a spur or a conveying cylinder may be used as long as the spur or the conveying cylinder has the function of conveying the recording medium 1100. From the viewpoint of inhibiting the deformation of the recording medium 1100 by the heating, a configuration can be used in which the recording medium 1100 is conveyed while brought into close contact with the conveying member 2200 by blowing air from the heating portion 2000, or a mechanism can be arranged by which the recording medium is fixed to the conveying member 2200. Specific examples thereof include a technique including arranging holes in the conveying member 2200 and suctioning the recording medium 1100 from its rear surface side to fix the recording medium; and a technique including forming the conveying member 2200 from an appropriate material and electrostatically adsorbing the recording medium 1100 to fix the recording medium.

The surface temperature $T_d$ of the recording medium heated in the drying step is the surface temperature of the recording medium immediately after the recording medium has passed through the heating device. The surface temperature of the recording medium can be determined with a radiation thermometer.

A specific example of the radiation thermometer is a thermometer available under the trade name "Radiation Thermometer IT-545S" (manufactured by Horiba, Ltd.). The surface temperature $T_d$ of the recording medium heated in the drying step is lower than the glass transition temperature $T_g$ of the resin particle (that is, $T_g>T_d$). This can improve the fastness of an image. A heating temperature can be set in such a manner that a liquid component is quickly evaporated and that the recording medium 1100 is not overdried from the viewpoint of inhibiting the deformation of the recording medium 1100. Specifically, heating is performed in such a manner that the surface temperature $T_d$ of the recording medium is preferably 40° C. or higher to 100° C. or lower, more preferably 60° C. or higher to 80° C. or lower. In view of a conveying speed and an environmental temperature, the temperature of a dryer can be set in such a manner that the recording medium has a desired temperature. Specifically, the temperature of the dryer, such as a warm-air dryer, is preferably set to 40° C. or higher to 100° C. or lower, more preferably 60° C. or higher to 80° C. or lower. When a heated gas is blown to heat the recording medium 1100, a gas velocity can be set to 1 m/s or more to 100 m/s or less. The temperature of wind, such as warm air, can be measured using a K-type thermocouple thermometer. A specific example of a measuring machine is a machine available under the product name "AD-5605H" (manufactured by A&D Company, Limited). The surface temperature $T_d$ of the heated recording medium in the drying step is lower than the melting point of the wax particle. This can improve the fastness of an image.

The removal rate of the liquid components in the reaction liquid and the ink in the drying step can be 70% by mass or more based on the total mass of the reaction liquid and the ink. This can inhibit deformation of the recording medium.

The removal rate of the liquid components of the reaction liquid and the ink can be determined as described below.

The amounts of water in the reaction liquid and the ink before and after heat drying were measured with an infrared water content meter. The water removal rates were calculated from the respective measured values. The amounts of the organic solvent in the reaction liquid and the ink before and after drying were determined by measuring the respective organic solvent contents by liquid chromatography of the reaction liquid and the ink collected from the recording medium 1100. The removal rate of the total organic solvent was calculated from the respective measured values. The sum of the water removal rate and the organic solvent removal rate was defined as a liquid component removal rate.

However, when a non-volatile organic solvent having a boiling point much higher than water, such as glycerin, is contained, the non-volatile organic solvent does not evaporate by heat drying at 60° C. or higher to 120° C. or lower. Therefore, the water removal rate determined by the infrared water content meter was used as the liquid component removal rate.

Figure 5:
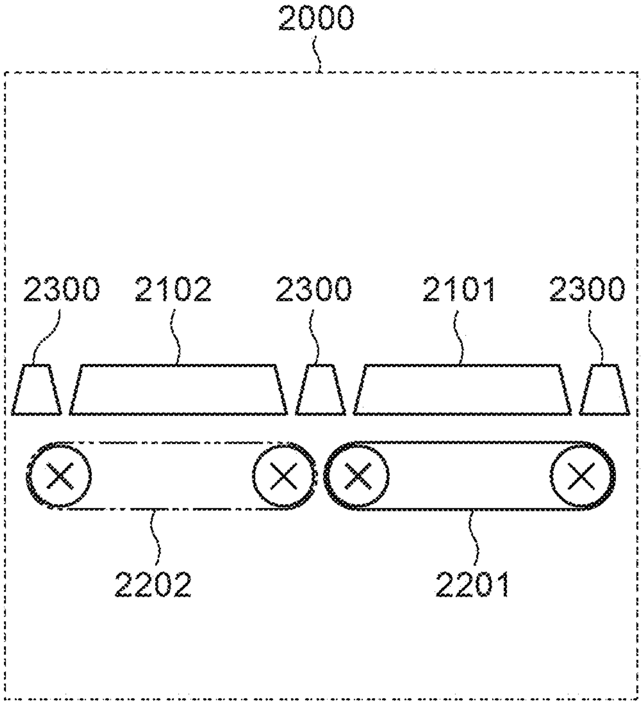
FIG. 5 is a schematic view illustrating another example of a heating portion.

FIG. 5 is a schematic view illustrating another example of the heating portion. Here, the differences from the heating portion illustrated in FIG. 1 and described above will be described. The heating portion 2000 illustrated in FIG. 5 includes a first heating device 2101, a second heating device 2102, a first conveying member 2201 and a second conveying member 2202, the first conveying member 2201 facing the first heating device 2101, and the second conveying member 2202 facing the second heating device 2102.

The first conveying member 2201 is not provided with a mechanism for fixing the recording medium 1100 by suction. The recording medium 1100 is conveyed while pressed against the first conveying member 2201 by warm air from the first heating device 2101. Thus, the recording medium 1100 can be delivered from the conveying member 1300 (FIG. 1) to the first conveying member 2201 and from the first conveying member 2201 to the second conveying member 2202 with high accuracy. In addition, a conveyance shift due to a slight difference in conveying speed between the conveying member 1300 (FIG. 1) and the first conveying member 2201 can be reduced. Meanwhile, a conveying belt having holes that can pass a gas therethrough is used for the second conveying member 2202, and the recording medium 1100 is conveyed while fixed to the second conveying member 2202 with a suction mechanism (not illustrated).

Air knives 2300 are arranged between the conveying member 1300 (FIG. 1) and the first conveying member 2201, between the first conveying member 2201 and the second conveying member 2202 and between the second conveying member 2202 and a conveying member 3200 (FIG. 1). The lifting of the leading end portion of the recording medium 1100 conveyed is pressed down with a wind pressure from the air knives 2300. Thus, the collision of the leading end portion of the recording medium 1100 with the first heating device 2101, the second heating device 2102 and the fixing member 3100 (FIG. 1) can be avoided to inhibit the occurrence of a conveyance failure.

The first heating device 2101 and the second heating device 2102 may each have the same configuration as that of the above-mentioned heating device 2100. The first heating device 2101 and the second heating device 2102 may have the same or different temperatures. In the case of heating by blowing a heated gas, the gas velocity may be the same or different. Heating may be performed from the first conveying member 2201 and the second conveying member 2202, as needed.

Fixing Portion

As illustrated in FIG. 1, the fixing portion 3000 is a contact-type heat and pressure-applying mechanism including the fixing member 3100 serving as a fixing belt, such as an endless belt, and the conveying member 3200. In the fixing portion 3000, the recording medium 1100 is conveyed by the conveying member 3200. The fixing member 3100 is brought into contact with the recording medium 1100 while pressure is applied to the recording medium 1100, to heat the liquids, such as the reaction liquid and the ink, applied to the recording medium 1100. Thereby, an image can be fixed to the recording medium 1100. After the liquid components of the reaction liquid and the ink permeate in the recording medium 1100 on which the image has been recorded, and evaporate as they pass through the heating portion 2000, the image are fixed in the fixing portion 3000, thereby resulting in the completion of the image. Heat and pressure are applied to the recording medium 1100 while the recording medium 1100 is interposed between the fixing member 3100 and the conveying member 3200, so that the image on the recording medium 1100 comes into close contact with the fixing member 3100, thereby fixing the image to the recording medium 1100. When a liquid, such as ink containing a resin particle and a coloring material, is used, the resin particle is softened and forms a film mainly by heating in the fixing portion 3000, and the coloring material can be bound to the recording medium 1100.

An example of a method for heating the fixing member 3100 is a method in which heating is performed by a heat source, such as a halogen heater, disposed in a roller that drives the fixing member 3100 serving as a fixing belt. A further example thereof is a method in which heating is performed by a heat source, such as an infrared heater, at a location separate from the fixing member 3100. These methods may be combined with each other. The conveying member 3200 may be heated, as needed. As the fixing member 3100, a fixing roller or the like may be used.

The temperature of the contact-type heat and pressure-applying mechanism (fixing member 3100) and the surface temperature of the recording medium immediately after passing through the contact-type heat and pressure-applying mechanism can both be measured using a radiation thermometer. The radiation thermometer is only required to be disposed near an end portion (terminal) of the contact-type heat and pressure-applying mechanism. A specific example of the radiation thermometer is a thermometer available under the trade name "Radiation Thermometer IT-545S" (manufactured by Horiba, Ltd.).

The ink contains a resin particle and a wax particle. In the fixing step, a fixing member and a recording medium that satisfy the relationship of the following formula (1) are used.

$$T_m > \frac{\sqrt{\lambda_{CH} C_{CH}} \times T_{CH} + \sqrt{\lambda_{paper} C_{paper}} \times T_{paper}}{\sqrt{\lambda_{CH} C_{CH}} + \sqrt{\lambda_{paper} C_{paper}}} \geq T_g > T_d \qquad \text{formula (1)}$$

$\lambda_{CH}$, $C_{CH}$, $\lambda_{paper}$ and $C_{paper}$ can satisfy the relationship of the following formula (2). This can further improve the fastness of an image.

$$\lambda_{CH} C_{CH} \geq \lambda_{paper} C_{paper} \qquad \text{formula (2)}$$

The thermal conductivity $\lambda_{CH}$ of the fixing member is preferably 0.10 W/m· K or more to 20.00 W/m·K or less, more preferably 0.26 W/m·K or more to 15.10 W/m· K or less. The thermal capacity $C_{CH}$ of the fixing member is preferably $1.00\times10^6$ J/m$^3$·K or more to $5.00\times10^6$ J/m$^3$·K or less, more preferably $1.55\times10^6$ J/m$^3$·K or more to $3.86\times10^6$ J/m$^3$·K or less. The surface temperature $T_{CH}$ of the fixing member immediately before the fixing member comes into contact with the recording medium is preferably 70° C. or higher to 120° C. or lower. The thermal conductivity $\lambda_{paper}$ of the recording medium is preferably 0.05 W/m·K or more to 0.10 W/m·K or less, more preferably 0.06 W/m·K or more to 0.08 W/m·K or less. The thermal capacity $C_{paper}$ of the recording medium is Preferably $1.00\times10^6$ J/m$^3$·K or more to $3.00\times10^6$ J/m$^3$·K or less, more preferably $1.17\times10^6$ J/m$^3$·K or more to $2.24\times10^6$ J/m$^3$·K or less. The surface temperature $T_{paper}$ of the recording medium immediately before the recording medium comes into contact with the fixing member is preferably 40° C. or higher to 80° C. or lower.

A nip pressure between the fixing member 3100 and the conveying member 3200, that is, a pressure applied to the recording medium when the medium passes through the contact-type heat and pressure-applying mechanism is preferably 10 Pa or more to 1,000 Pa or less, more preferably 10 Pa or more to 500 Pa or less and still more preferably 10 Pa or more to 400 Pa or less. When the nip pressure is within the above range, the wax particle is less likely to be excessively pressed into the image, thus improving the fastness of the image. The pressure (nip pressure between the fixing member 3100 and the conveying member 3200) applied to the recording medium when the recording medium passes through the contact-type heat and pressure-applying mechanism can be measured, for example, with a surface pressure measurement film. A specific example of the surface pressure measurement film is a surface pressure measurement film available under the trade name "Prescale" (manufactured by Fujifilm Corporation), and the appropriate model number can be selected according to the pressure range.

The time period (nip time) required for the recording medium to pass through the contact-type heat and pressure-applying mechanism is preferably 0.25 seconds or more to 5.0 seconds or less, more preferably 0.5 seconds or more to 4.0 seconds or less, and particularly preferably 1.0 second or more to 3.0 seconds or less.

The fixing member 3100 constituting the contact-type heat and pressure-applying mechanism is preferably a fixing belt such as an endless belt. When the fixing belt is used as the fixing member 3100, a long contact time between the fixing member 3100 and the recording medium 1100 can be set. For this reason, the resin particle in the ink can be more sufficiently melted and fixed, further improving the fastness of the image.

Figure 6:
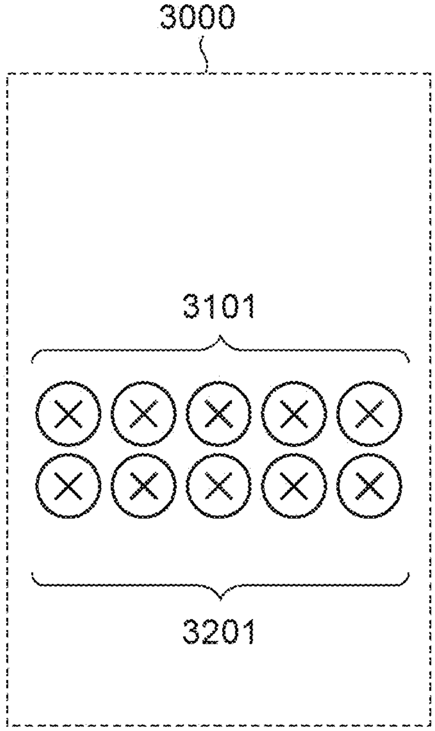
FIG. 6 is a schematic view illustrating another example of a fixing portion.

FIG. 6 is a schematic view illustrating another example of the fixing portion. Here, the differences from the fixing portion illustrated in FIG. 1 and described above will be described. The fixing portion 3000 illustrated in FIG. 6 is a contact-type heat and pressure-applying mechanism including a plurality of fixing rollers 3101 and a plurality of conveying members 3201 facing these fixing rollers 3101. The recording medium 1100 to which a liquid such as ink has been applied passes between the fixing rollers 3101 and the conveying members 3201, thereby fixing an image to the recording medium. It is possible to adjust the extent to which the image is fixed to the recording medium by controlling the number of fixing rollers 3101, the number of conveying members 3201, the nip time of the recording medium, the temperature, the pressure and so forth.

Cooling Portion

The cooling portion 4000 includes the cooling member 4100 and a conveying member 4200 (FIG. 1). The cooling portion 4000 cools the recording medium 1100 that has passed through the heating portion 2000 and the fixing portion 3000 to have a high temperature. The cooling member 4100 may have any configuration as long as it can cool the recording medium 1100, and methods such as air cooling and water cooling can be used. In particular, blowing an unheated gas can be performed from the viewpoint of safety and energy efficiency. To jet a gas to the recording medium 1100, the use of a mechanism for blowing a gas with a built-in fan easily improves the cooling efficiency. In view of the conveying speed and the environmental temperature, the temperature of a cooling unit can be set in such a manner that the recording medium has a desired temperature. Specifically, the temperature of the cooling unit, such as an air blower, is preferably 20° C. or higher to 60° C. or lower, more preferably 25° C. or higher to 50° C. or lower. When cooling is performed by blowing a gas, the gas velocity can be 1 m/s or more to 100 m/s or less. The use of the conditions can inhibit the deformation of the recording medium 1100 to be stacked in the sheet delivery portion 6000 described below and the image sticking (blocking).

Reversing Portion

When double-sided recording is performed, the recording medium 1100 is reversed by the use of the reversing portion 5000 (FIG. 1). The recording medium 1100 having an image recorded on its recording surface (front surface) passes through the cooling portion 4000, is then conveyed to a branch line, and reversed by the reversing device 5100. The recording medium 1100 that has been reversed is conveyed to the sheet feeding device 1400 of the recording portion 1000 in such a manner that the liquids can be applied to its rear surface, which is a surface opposite to the recording surface (front surface).

Sheet Delivery Portion

The recording medium 1100 after the image recording is stored in the sheet delivery portion 6000 (FIG. 1). The recording medium 1100 is subjected to single-sided recording or double-sided recording, and then passes through the cooling portion 4000, is conveyed by the conveying member 6100 and finally stored in a stacked state in the recording medium storage portion 6200. Two or more recording medium storage portions 6200 may be arranged for, for example, separately storing different recorded articles.

Reaction Liquid

The recording method according to an embodiment of the present disclosure can further includes, before the ink applying step, a reaction liquid applying step of applying an aqueous reaction liquid containing a reactant that reacts with the aqueous ink to the recording medium. Components and so forth used in the reaction liquid will be described in detail below.

Reactant

The reaction liquid reacts with the ink when the reaction liquid comes into contact with the ink, to allow a component, such as a component having an anionic group, e.g., a resin, a surfactant or a self-dispersible pigment, in the ink to aggregate, and contains a reactant. The presence of the reactant destabilizes the state of the component having an anionic group in the ink when the ink comes into contact with the reactant on the recording medium, and can promote aggregation of the component in the ink. Examples of the reactant include cationic components, such as polyvalent metal ions and cationic resins, and organic acids. These reactants may be used alone or in combination of two or more.

Examples of polyvalent metal ions constituting polyvalent metal salts include divalent metal ions, such as $Ca^{2+}$, $Cu^{2+}$, $Ni^{2+}$, $Mg^{2+}$, $Sr^{2+}$, $Ba^{2+}$ and $Zn^{2+}$; and trivalent metal ions, such as $Fe^{3+}$, $Cr^{3+}$, $Y^{3+}$ and $Al^{3+}$. To incorporate a polyvalent metal ion into the reaction liquid, a water-soluble polyvalent metal salt, which may be a hydrate, formed by combining a polyvalent metal ion with an anion can be used. Examples of the anion include inorganic anions, such as $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $PO_4^{3-}$, $HPO_4^{2-}$ and $H_2PO_4^-$; and organic anions, such as $HCOO^-$, $(COO^-)_2$, $COOH(COO^-)$, $CH_3COO^-$, $CH_3CH(OH)COO$, $C_2H_4(COO^-)_2$, $C_6H_5COO^-$, $C_6H_4(COO^-)_2$ and $CH_3SO_3^-$. When a polyvalent metal ion is used as the reactant, the content (% by mass) in terms of a polyvalent metal salt in the reaction liquid can be 1.0% by mass or more to 20.0% by mass or less based on the total mass of the reaction liquid. In the present specification, when the polyvalent metal salt is a hydrate, the term "polyvalent metal salt content (% by mass)" in the reaction liquid refers to the "anhydrous polyvalent metal salt content (% by mass)" excluding water in the hydrate.

The reaction liquid containing an organic acid has a buffering capacity in the acidic region (a pH of less than 7.0, such as a pH of 2.0 or more to 5.0 or less) and thus efficiently converts the anionic group of the component present in the ink into an acid form, thereby allowing them to aggregate. Examples of the organic acid include monocarboxylic acids and salts thereof, such as formic acid, acetic acid, propionic acid, butyric acid, benzoic acid, glycolic acid, lactic acid, salicylic acid, pyrrolecarboxylic acid, furancarboxylic acid, picolinic acid, nicotinic acid, thiophenecarboxylic acid, levulinic acid and coumalic acid; dicarboxylic acids and salts and hydrogen salts thereof, such as oxalic acid, malonic acid, succinic acid, glutaric acid, adipic acid, maleic acid, fumaric acid, itaconic acid, sebacic acid, phthalic acid, malic acid and tartaric acid; tricarboxylic acids and salts and hydrogen salts thereof, such as citric acid and trimellitic acid; and tetracarboxylic acids and salts and hydrogen salts thereof, such as pyromellitic acid. When an organic acid is used as the reactant, the organic acid content (% by mass) of the reaction liquid can be 1.0% by mass or more to 50.0% by mass or less based on the total mass of the reaction liquid.

Examples of cationic resins include resins having a primary, secondary or tertiary amine structure, and resins having a quaternary ammonium salt structure. Specific examples thereof include resins having structures of, for example, vinylamine, allylamine, vinylimidazole, vinylpyridine, dimethylaminoethyl methacrylate, ethyleneimine, guanidine, diallyldimethylammonium chloride and alkylamine-epichlorohydrin condensates. To improve the solubility in the reaction liquid, a cationic resin may be used in combination with an acidic compound, or the cationic resin may be subjected to quaternization treatment. When a cationic resin is used as the reactant, the cationic resin content (% by mass) of the reaction liquid can be 0.1% by mass or more to 10.0% by mass or less based on the total mass of the reaction liquid.

Aqueous Medium

The reaction liquid is an aqueous reaction liquid containing at least water as an aqueous medium. Examples of the aqueous medium for use in the reaction liquid include the same ones as the aqueous medium which can be contained in the ink, which will be described below. The aqueous medium for use in the reaction liquid may contain a water-soluble organic solvent, which will be described below and which can be contained in the ink. The water-soluble organic solvent content (% by mass) of the reaction liquid can be 1.0% by mass or more to 45.0% by mass or less based on the total mass of the reaction liquid. The water-soluble organic solvent can contain a specific water-soluble hydrocarbon compound described below. The water-soluble hydrocarbon compound content (% by mass) of the reaction liquid can be 1.0% by mass or more to 20.0% by mass or less based on the total mass of the reaction liquid. The water content (% by mass) of the reaction liquid can be 50.0% by mass or more to 95.0% by mass or less based on the total mass of the reaction liquid.

Other Components

The reaction liquid may contain various other components as needed. Examples of the other components include the same other components that can be contained in the ink, which will be described below.

Physical Properties of Reaction Liquid

The reaction liquid is an aqueous reaction liquid used for an ink jet system. Thus, from the viewpoint of reliability, the physical property values of the reaction liquid can be appropriately controlled. Specifically, the surface tension of the reaction liquid at 25° C. can be 20 mN/m or more to 60 mN/m or less. The viscosity of the reaction liquid at 25° C. can be 1.0 mPa·s or more to 10.0 mPa·s or less. The pH of the reaction liquid at 25° C. is preferably 5.0 or more to 9.5 or less, more preferably 6.0 or more to 9.0 or less.

Ink

The ink for use in the recording method according to an embodiment of the present disclosure is an aqueous ink for ink jet recording, the aqueous ink containing a resin particle and a wax particle. Components and so forth used for the ink will be described in detail below.

Coloring Material

The ink can contain a coloring material. As the coloring material, a pigment or a dye can be used. The coloring material content (% by mass) of the ink is preferably 0.5% by mass or more to 15.0% by mass or less, more preferably 1.0% by mass or more to 10.0% by mass or less, based on the total mass of the ink.

Specific examples of the pigment include inorganic pigments, such as carbon black and titanium oxide; and organic pigments, such as azo, phthalocyanine, quinacridone, isoindolinone, imidazolone, diketopyrrolopyrrole and dioxazine. The pigments may be used alone or in combination of two or more.

With regard to a method for dispersing the pigment, a resin-dispersed pigment using a resin as a dispersant, or a self-dispersible pigment in which a hydrophilic group is bonded to the surface of a pigment particle can be used. A resin-bonded pigment in which a resin-containing organic group is chemically bonded to the surface of a pigment particle, and a microencapsulated pigment in which the surface of a pigment particle is coated with a resin or the like can also be used. It is also possible to use a combination of these pigments having different dispersion methods. In particular, a resin-dispersed pigment in which a resin serving as a dispersant is physically adsorbed onto the surface of a pigment particle can be used, rather than a resin-bonded pigment or a microencapsulated pigment.

As a resin dispersant for dispersing a pigment in an aqueous medium, a dispersant that can disperse a pigment in an aqueous medium by the action of an anionic group can be used. As a resin dispersant, a resin having an anionic group can be used, and a resin as described below, particularly a water-soluble resin, can be used. The pigment content (% by mass) of the ink can be 0.3 to 10.0 times the resin dispersant content (% by mass) in terms of mass ratio.

As the self-dispersible pigment, it is possible to use a pigment in which an anionic group, such as a carboxylic acid group, a sulfonic acid group or a phosphonic acid group, is bonded to the surface of a pigment particle directly or with another atomic group (—R—) interposed therebetween. The anionic group may be in an acid form or a salt form. When the anionic group is in a salt form, the anionic group may be in a partially dissociated state or a completely dissociated state. When the anionic group is in a salt form, examples of a cation serving as a counter ion include an alkali metal cation, ammonium and organic ammonium. Specific examples of the other atomic group (—R—) include linear or branched alkylene groups having 1 to 12 carbon atoms; arylene groups, such as a phenylene group and a naphthylene group; carbonyl groups; imino groups; amide groups; sulfonyl groups; ester groups; and ether groups. It may also be a combination of these groups.

A dye having an anionic group can be used. Specific examples of the dye include azo, triphenylmethane, (aza) phthalocyanine, xanthene and anthrapyridone dyes. These dyes may be used alone or in combination of two or more. The coloring material can be a pigment, such as a resin-dispersed pigment or a self-dispersible pigment.

Resin

The ink contains a resin particle. The use of the resin particle-containing ink makes it possible to record an image having excellent fastness. The ink may further contain a water-soluble resin soluble in an aqueous medium. The water-soluble resin can be added to the ink in order to (i) stabilize the dispersion state of the pigment, that is, the resin can be added as a resin dispersant or its aid. The resin can also be added to the ink in order to (ii) improve various characteristics of the image to be recorded.

The resin content (% by mass) of the ink is preferably 0.1% by mass or more to 20.0% by mass or less, more preferably 0.5% by mass or more to 15.0% by mass or less, based on the total mass of the ink. Examples of the form of the resin include a block copolymer, a random copolymer, a graft copolymer and a combination thereof. The resin may be a water-soluble resin soluble in an aqueous medium, or may be a resin particle that is dispersed in an aqueous medium. These resins may be used alone or in combination of two or more.

Composition of Resin

Examples of the resin include an acrylic resin, a urethane-based resin and an olefin-based resin. Among them, an acrylic resin and a urethane-based resin can be used, and an acrylic resin composed of units derived from (meth)acrylic acid or (meth)acrylate can be used.

An acrylic resin having a hydrophilic unit and a hydrophobic unit as constituent units can be used as the acrylic resin. In particular, a resin having a hydrophilic unit derived from (meth)acrylic acid and a hydrophobic unit derived from at least one of a monomer having an aromatic ring and a (meth)acrylic acid ester monomer can be used. Especially, a resin having a hydrophilic unit derived from (meth)acrylic acid and a hydrophobic unit derived from at least one monomer selected from styrene and α-methylstyrene can be used. These resins easily interact with pigments, and thus can be used as resin dispersants for dispersing pigments.

The hydrophilic unit is a unit having a hydrophilic group such as an anionic group. The hydrophilic unit can be formed, for example, by polymerizing a hydrophilic monomer having a hydrophilic group. Specific examples of the hydrophilic monomer having a hydrophilic group include acidic monomers having a carboxylic acid group, such as (meth)acrylic acid, itaconic acid, maleic acid and fumaric acid; and anionic monomers, such as anhydrides and salts of these acidic monomers. Examples of a cation constituting the salt of the acidic monomer include a lithium ion, a sodium ion, a potassium ion, an ammonium ion and organic ammonium ion. The hydrophobic unit is a unit having no hydrophilic group, such as an anionic group. The hydrophobic unit can be formed, for example, by polymerizing a hydrophobic monomer having no hydrophilic group, such as an anionic group. Specific examples of the hydrophobic monomer include monomers having an aromatic ring, such as styrene, α-methylstyrene and benzyl (meth)acrylate; and (meth)acrylic acid ester monomers, such as methyl (meth) acrylate, butyl (meth)acrylate and 2-ethylhexyl (meth)acrylate.

The urethane-based resin can be prepared, for example, by reacting a polyisocyanate with a polyol. The urethane-based resin may also be one that has been reacted with a chain extender. Examples of the olefin-based resin include polyethylene and polypropylene.

Resin Properties

In the present specification, the expression "a resin is water-soluble" indicates that when the resin is neutralized with an alkali equivalent to the acid value, the resin is present in an aqueous medium in a state in which the resin is not in the form of a particle having a particle size that can be measured by a dynamic light scattering method. Whether a resin is water-soluble can be determined according to a method described below. First, a liquid (resin solid content: 10% by mass) containing a resin neutralized with an alkali, such as sodium hydroxide or potassium hydroxide, equivalent to its acid value is prepared. Subsequently, the prepared liquid is diluted 10 times (on a volume basis) with pure water to prepare a sample solution.

Then, in the case where the particle size of the resin in the sample solution is measured by the dynamic light scattering method and where a particle having a particle size is not measured, the resin can be determined to be water-soluble. The measurement conditions at this time can be as follows: for example, SetZero: 30 seconds; the number of times of measurement: 3 times; and measurement time: 180 seconds. A particle size analyzer based on the dynamic light scattering method (e.g., trade name: "UPA-EX150", manufactured by Nikkiso Co., Ltd.) or the like may be used as a particle size distribution measurement apparatus.

Of course, the particle size distribution measurement apparatus, the measurement conditions and so forth are not limited to the foregoing.

The acid value of the water-soluble resin can be 100 mgKOH/g or more to 250 mgKOH/g or less. The weight-average molecular weight of the water-soluble resin can be 3,000 or more to 15,000 or less.

The acid value of the resin constituting the resin particle can be 5 mgKOH/g or more to 100 mgKOH/g or less. The weight-average molecular weight of the resin constituting the resin particle is preferably 1,000 or more to 3,000,000 or less, more preferably 100,000 or more to 3,000,000 or less. The 50% cumulative particle size ($D_{50}$) of the resin particle measured by a dynamic light scattering method on a volume basis can be 50 nm or more to 500 nm or less. The 50% cumulative particle size of the resin particle on a volume basis is a diameter of a particle at which the cumulative value from the small particle size side reaches 50% based on the total volume of the measured particle in a particle size cumulative curve. The 50% cumulative particle size of the resin particle on a volume basis can be measured based on the particle size analyzer and the measurement conditions by the dynamic light scattering method described above.

The glass transition temperature $T_g$(° C.) of the resin particle is lower than the surface temperature $T_d$(° C.) of the recording medium heated in the drying step. The glass transition temperature $T_g$(C) of the resin particle is preferably 40° C. or higher to 120° C. or lower, more preferably 50° C. or higher to 110° C. or lower, particularly preferably 50° C. or higher to 100° C. or lower. The glass transition temperature (° C.) of the resin particle can be measured with a differential scanning calorimeter (DSC). The resin particle does not need to contain a coloring material.

The glass transition temperature of the resin particle in the ink can be measured, for example, by ultracentrifuging the ink, separating the resin particle, washing and drying the particle and then using a differential scanning calorimeter. The volume-based 50% cumulative particle size (D50) of the resin particle in the ink can be measured, for example, by ultracentrifuging the ink, separating the resin particle, washing and drying the particle, and then using a particle size distribution measurement apparatus. The same measurement can also be performed using an aqueous dispersion of a resin particle used to prepare the ink.

Wax Particle

The ink may contain a particle composed of wax (wax particle).

The use of the ink containing the wax particle can record an image having further improved abrasion resistance. The wax in the present specification may be a composition in which a component other than the wax is blended, or may be the wax itself. The wax particle may be dispersed by a dispersant, such as a surfactant or a resin. One type of wax may be used alone, or two or more types of waxes may be used in combination. The wax particle content (% by mass) of the ink is preferably 0.1% by mass or more to 10.0% by mass or less, more preferably 1.0% by mass or more to 5.0% by mass or less, based on the total mass of the ink.

In a narrow sense, the wax is an ester of a fatty acid with a higher monohydric alcohol or dihydric alcohol insoluble in water, and includes an animal wax and a vegetable wax but includes no oil or fat. In a broad sense, the wax includes a high-melting-point fat, a mineral-based wax, a petroleum-based wax and a blend and a modified product of various waxes. According to an embodiment of the present disclosure, any wax in a broad sense can be used without particular limitation. The wax in a broad sense can be classified into natural wax, synthetic wax, a blend thereof (blended wax) and a modified product thereof (modified wax).

Examples of the natural wax include animal-based wax, such as beeswax, spermaceti, or wool wax (lanolin); plant-based wax, such as Japan wax, carnauba wax, sugarcane wax, palm wax, candelilla wax, or rice wax; mineral-based wax, such as montan wax; and petroleum-based wax, such as paraffin wax, microcrystalline wax and petrolatum. Examples of the synthetic wax include hydrocarbon wax, such as Fischer-Tropsch wax and polyolefin wax, e.g., polyethylene wax and polypropylene wax. The blended wax is a mixture of the various waxes described above. The modified wax is prepared by subjecting the above-described various waxes to modification treatment, such as oxidation, hydrogenation, alcohol modification, acrylic modification or urethane modification. These waxes may be used alone or in combination of two or more. The wax can be at least one selected from the group consisting of microcrystalline wax, Fischer-Tropsch wax, polyolefin wax, paraffin wax, modified products thereof and blends thereof. Among these, a blend of a plurality of waxes can be used. A blend of petroleum-based wax and synthetic wax can be used.

The wax can be solid at room temperature (25° C.). The melting point $T_m$ (° C.) of the wax is preferably 40° C. or higher to 120° C. or lower, more preferably 50° C. or higher to 120° C. or lower, particularly preferably 60° C. or higher to 120° C. or lower. The melting temperature of the wax can be determined in accordance with a test method described in 5.3.1 (testing method for melting point) of JIS K 2235:1991 (Petroleum waxes). For microcrystalline wax, petrolatum and a mixture of a plurality of waxes, the melting point can be more accurately measured by a test method described in 5.3.2. The melting point of the wax is easily affected by properties, such as molecular weight (a higher molecular weight results in a higher melting point), molecular structure (a linear structure has a high melting point, and a branched structure has a lower melting point), crystallinity (a high crystallinity results in a higher melting point) and density (a higher density results in a higher melting point).

Thus, wax having a desired melting point can be produced by controlling these properties. The melting point of the wax in the ink can be determined by, for example, subjecting the ink to ultracentrifugation treatment, washing and drying the separated wax, and then performing measurement in accordance with the above-described test method.

Aqueous Medium

The ink for use in the recording method according to an embodiment of the present disclosure is an aqueous ink containing at least water as an aqueous medium. The ink can contain water or an aqueous medium that is a mixed solvent of water and a water-soluble organic solvent. Deionized water or ion-exchanged water can be used as the water. The water content (% by mass) of the aqueous ink can be 50.0% by mass or more to 95.0% by mass or less based on the total mass of the ink. The water-soluble organic solvent content (% by mass) of the aqueous ink can be 2.0% by mass or more to 40.0% by mass or less based on the total mass of the ink. Examples of the water-soluble organic solvent include alcohol, (poly)alkylene glycol, glycol ether, a nitrogen-containing solvent and a sulfur-containing solvent, which can be used in an ink for ink jet recording. These water-soluble organic solvents may be used alone or in combination of two or more.

Water-Soluble Hydrocarbon Compound

The water-soluble organic solvent incorporated into the ink can contain a specific water-soluble hydrocarbon compound. This water-soluble hydrocarbon compound is a compound that has a hydrocarbon chain having 3 or more carbon atoms and that is substituted with 2 or more hydrophilic groups selected from the group consisting of a hydroxy group, an amino group and an anionic group. However, the hydrocarbon chain may be interrupted by a sulfonyl group or an ether group. When the hydrocarbon chain has 3 or 4 carbon atoms, the hydrophilic group contains an anionic group or the hydrocarbon chain is interrupted by a sulfonyl group.

In an embodiment of the present disclosure, a hydrocarbon compound in the state of being dissolved in water at a compound content of the ink at 25° C. is defined as being "water-soluble". That is, the solubility of the compound in water at 25° C. is larger than the compound content of the ink. The fact that the hydrocarbon chain is interrupted by a sulfonyl group or an ether group indicates that a sulfonyl group (—S(=O)$_2$—) or an ether group (—O—) is present in the middle of the hydrocarbon chain. The water-soluble hydrocarbon compound has a hydrogen-bonding group, such as a hydroxy group, an amino group, an anionic group, a sulfonyl group or an ether group. For this reason, the use of the ink containing the hydrocarbon compound can inhibit the cockling or curl of a recording medium on which an image has been recorded. A typical hydrocarbon compound having a hydrocarbon chain having a relatively small number of carbon atoms (3 or 4 carbon atoms) has a small molecular weight and tends to have a low vapor pressure. However, since the above-mentioned water-soluble hydrocarbon compound has a hydrogen-bonding anionic group or its hydrocarbon chain is interrupted by a sulfonyl group, the compound is less likely to evaporate owing to an intermolecular or intramolecular interaction and thus remains between fibers to provide the effect of inhibiting the cockling or curl. The water-soluble hydrocarbon compound content (% by mass) of the ink can be 1.0% by mass or more to 20.0% by mass or less based on the total mass of the ink.

The number of the carbon atoms of the hydrocarbon chain constituting the water-soluble hydrocarbon compound is preferably 3 or more to 50 or less, more preferably 3 or more to 10 or less. Examples of the anionic group include a sulfonic acid group and a carboxylic acid group. Specific examples of the water-soluble hydrocarbon compound include alkanediols, such as 1,5-pentanediol and 1,6-hexanediol; amino acids, such as alanine, β-alanine, trimethylglycine, amidosulfuric acid (alias: sulfamic acid), aminomethanesulfonic acid, taurine (synonym: 2-aminoethanesulfonic acid), carbamic acid, glycine, aspartic acid, glutamic acid, sulfanilic acid, salts of the acids described above, phenylalanine, leucine, isoleucine, threonine, tryptophan, valine, methionine, lysine and arginine; sulfonyl compounds, such as bis(2-hydroxyethyl) sulfone; alkylene glycols, such as triethylene glycol, tetraethylene glycol, tripropylene glycol and a polyethylene glycol having a number-average molecular weight of about 200 or more to about 1,000 or less; and sugars, such as sorbitol, D-sorbitol, xylitol, trehalose, fructose and D(+)-xylose. These water-soluble hydrocarbon compounds may be used alone or in combination two or more.

Other Components

The ink may contain various other components as needed. Examples of the other components include various additives, such as a defoaming agent, a surfactant, a pH adjuster, a viscosity modifier, a rust inhibitor, a preservative, an antifungal agent, an antioxidant, and a reduction inhibitor. However, the ink need not contain the reactant contained in the reaction liquid.

Physical Properties of Ink

The ink is an aqueous ink used for an ink jet system. Thus, from the viewpoint of reliability, the physical property values can be appropriately controlled. The surface tension of the ink at 25° C. can be 20 mN/m or more to 60 mN/m or less. The viscosity of the ink at 25° C. can be 1.0 mPa·s or more to 10.0 mPa·s or less. The pH of the ink at 25° C. is preferably 7.0 or more to 9.5 or less, more preferably 8.0 or more to 9.5 or less.

According to an embodiment of the present disclosure, it is possible to provide the ink jet recording method by which an image having excellent fastness can be recorded while the cockling of the ink-absorbent recording medium is inhibited.

According to another embodiment of the present disclosure, it is possible to provide the ink jet recording apparatus and the aqueous ink for use in the ink jet recording method.

EXAMPLES

While the present disclosure will be described in more detail with reference to examples and comparative examples, the present disclosure is not limited at all by the following examples as long as the gist of the present disclosure is not exceeded. Regarding the amount of component, "part(s)" and "%" are based on mass unless otherwise specified.

Preparation of Reaction Liquid

The following components were mixed. The resulting mixtures were sufficiently stirred and subjected to pressure filtration through cellulose acetate filters (manufactured by Advantec Toyo Kaisha, Ltd.) having a pore size of 3.0 μm to prepare a reaction liquid.

- Glutaric acid: 21.0%
- Potassium hydroxide: 2.0%
- Glycerin: 5.0%
- Megaface F444 (manufactured by DIC Corporation): 5.0%
- Ion-exchanged water: 67.0%

Preparation of Pigment Dispersion

Pigment Dispersion 1

A styrene-ethyl acrylate-acrylic acid copolymer (resin 1) having an acid value of 150 mgKOH/g and a weight-average molecular weight of 8,000 was provided. Then 20.0 parts of resin 1 was neutralized with potassium hydroxide in an amount equimolar to the acid value thereof. An appropriate amount of pure water was added thereto to prepare an aqueous solution of resin 1 having a resin content (solid content) of 20.0%. A mixture was obtained by mixing 10.0 parts of carbon black (trade name: Monarch 1100, manufactured by Cabot Corporation), 15.0 parts of the aqueous solution of resin 1 and 75.0 parts of pure water. The resulting mixture and 200 parts of zirconia beads having a diameter of 0.3 mm were placed into a batch-type vertical sand mill (manufactured by Aimex Co., Ltd.) and dispersed for 5 hours while the sand mill was cooled with water. After removing a coarse particle by centrifugation, pressure filtration was performed with a cellulose acetate filter (manufactured by Advantec Toyo Kaisha, Ltd.) having a pore size of 3.0 μm to prepare pigment dispersion 1 having a pigment content of 10.0% and a resin dispersant (resin 1) content of 3.0%.

Preparation of Resin Particle

First, 20 parts of ethyl methacrylate, 3 parts of 2,2'-azobis (2-methylbutyronitrile) and 2 parts of n-hexadecane were mixed, and the mixture was stirred for 0.5 hours. This mixture was added dropwise to 75 parts of an 8% aqueous solution of styrene-butyl acrylate-acrylic acid copolymer (acid value: 130 mgKOH/g, weight-average molecular weight (Mw): 7,000), and the resulting mixture was stirred for 0.5 hour. The mixture was irradiated with ultrasonic waves for 3 hours using an ultrasonic irradiator. Subsequently, a polymerization reaction was performed for 4 hours under a nitrogen atmosphere at 80° C. The reaction mixture was cooled to room temperature and then filtered to prepare a resin particle dispersion having a resin particle content of 25.0% by mass. The glass transition temperature $T_g$ of the resin particle was 85° C.

Glass Transition Temperature of Resin Particle

A resin obtained by drying the aqueous dispersion of the resin particle was prepared as a sample. Using a differential scanning calorimeter (trade name "Q200", manufactured by TA Instruments), a temperature increase cycle in which the temperature was increased from −70° C. to 180° C. at a rate of 10° C./min was performed twice, and the glass transition temperature ($T_g$(° C.)) of the resin particle was measured.

Preparation of Ink

Components (unit: %) described below were mixed. The resulting mixture was sufficiently stirred and subjected to pressure filtration through a cellulose acetate filter (manufactured by Advantec Toyo Kaisha, Ltd.) having a pore size of 3.0 μm to prepare a black ink. "Acetylenol E100" is the trade name of a surfactant manufactured by Kawaken Fine Chemicals Co., Ltd. "Hi-Mic-2095" is the trade name of a microcrystalline wax manufactured by Nippon Seiro Co., Ltd.

- Pigment: 4.0%
- Resin particle: 6.0%
- Glycerin: 7.0%
- Polyethylene glycol (number-average molecular weight (Mn): 1,000): 1.0%
- Surfactant (Acetylenol E100): 0.5%
- Wax (Hi-Mic-2095, melting point $T_m$: 103° C.): 1.0%
- Ion-exchanged water: 80.5%

Evaluation

Images were recorded on recording media under the recording conditions given in Table 3 with the ink jet recording apparatus 100 having the configuration illustrated in FIG. 1. A warm-air dryer was used as the heating device 2100 in the heating portion 2000. The surface temperature $T_d$ of the recording medium 1100 was set to be the same as the surface temperature $T_{paper}$ of the recording medium immediately before the recording medium came into contact with the fixing member presented in Table 3. The surface temperature $T_d$ of the recording medium heated in this drying step was measured with a radiation thermometer IT-545S (manufactured by Horiba, Ltd.). As the fixing member 3100 in the fixing portion 3000, a fixing roller having a halogen heater as a heat source inside the roller was used. Table 1 presents the type of material of the surface of the fixing member 3100, the thermal properties (the thermal conductivity and the thermal capacity) and the nip pressure.

TABLE 1

| | Material | Thermal conductivity $\lambda_{CH}$ (W/m · K) | Thermal capacity $C_{CH}$ (J/m³ · K) | Nip pressure (Pa) |
|---|---|---|---|---|
| Fixing member 1 | Silicone rubber (Not containing carbon black) | 0.26 | $1.55 \times 10^6$ | 200 |
| Fixing member 2 | Silicone rubber (Containing carbon black) | 0.70 | $1.55 \times 10^6$ | 200 |
| Fixing member 3 | Stainless steel | 15.10 | $3.86 \times 10^6$ | 200 |

The reaction liquid was applied by the ink jet method to the recording medium before the application of the ink. The amount of the reaction liquid applied was 2 g/m$^2$. The amount of the ink applied was 32 g/m$^2$. A solid image was recorded on the entire surface of an A4-size recording medium. Table 2 presents the type, the presence or absence of a coating layer, and the thermal property values (the thermal conductivity and the thermal capacity) of the recording medium 1100 used. Each of the recording media 1 and 3 is a recording medium in which the amount of water absorbed from the start of contact to 30 msec$^{1/2}$ is more than 10 mL/m$^2$. The recording medium 2 is a recording medium in which the amount of water absorbed from the start of contact to 30 msec$^{1/2}$ is 5 mL/m$^2$ or more to 10 mL/m$^2$ or less.

TABLE 2

| | Type | Coating layer | Thermal conductivity $\lambda_{paper}$ (W/m · K) | Thermal capacity Cpaper (J/m³ · K) |
|---|---|---|---|---|
| Recording medium 1 | Plain paper | Absent | 0.06 | $1.17 \times 10^6$ |
| Recording medium 2 | Coated paper | Present | 0.08 | $2.24 \times 10^6$ |
| Recording medium 3 | Synthetic paper | Absent | 0.06 | $1.34 \times 10^6$ |

The recorded images were evaluated as described below. In the examples of the present disclosure, "AA", "A" and "B" were regarded as acceptable levels, and "C" was regarded as an unacceptable level in the evaluation criteria of the following items. The evaluation results are presented in Table 4.

Evaluation of Fastness

A cloth for fastness test (JIS L 0804, an attached white cotton cloth for a color fastness test, model No. 670101) to which 50 μL of artificial sweat (JIS L 0803, alkaline, pH: 8.0) had been applied was wound around a 120 g-weight friction block of a friction fastness tester (Japan Society for the Promotion of Science type, trade name: "AB-301", manufactured by Tester Sangyo Co., Ltd.). The image portion was subjected to 1 to 10 reciprocating rubbing tests. After the rubbing tests, the non-image portion and the test cloth were observed.

A: No ink adhesion was observed on the test cloth in the rubbing test of one reciprocation.

B: The ink slightly adhered to the test cloth, and ink adhesion due to rubbing was slightly observed in the non-image portion, but the ink adhesion was at an unnoticeable level.

C: The ink adhered to the test cloth, and ink adhesion due to rubbing was noticeably observed in the non-image portion.

Evaluation of Cockling Resistance

The printed portions of samples (A4-size full-page solid images) for evaluating cockling produced in the examples and comparative examples were visually observed. The evaluation criteria are described below.

A: No waviness was observed in the printed portion.

B: Waviness was observed in the printed portion, but the level was not problematic in practical use.

C: Waviness was conspicuous in the printed portion, and the level was problematic in practical use.

TABLE 3

| | Recording medium | Surface temperature of fixing member immediately before fixing member comes into contact with recording medium $T_{CH}$ (°C) | Fixing member | Surface temperature of recording medium immediately before recording medium comes into contact with fixing member $T_{paper}$ (°C) | $\frac{\sqrt{\lambda_{CH}C_{CH}} \times T_{CH} + \sqrt{\lambda_{paper}C_{paper}} \times T_p}{\sqrt{\lambda_{CH}C_{CH}} + \sqrt{\lambda_{paper}C_{paper}}}$ |
|---|---|---|---|---|---|
| Example 1 | Recording medium 1 | 100 | Fixing member 1 | 70 | 91 |
| Example 2 | Recording medium 1 | 100 | Fixing member 1 | 80 | 94 |
| Example 3 | Recording medium 2 | 100 | Fixing member 1 | 70 | 88 |
| Example 4 | Recording medium 3 | 100 | Fixing member 1 | 70 | 91 |
| Example 5 | Recording medium 1 | 100 | Fixing member 2 | 70 | 94 |
| Example 6 | Recording medium 2 | 100 | Fixing member 2 | 70 | 91 |
| Example 7 | Recording medium 1 | 100 | Fixing member 3 | 70 | 99 |

TABLE 3-continued

| | Recording medium | Surface temperature of fixing member immediately before fixing member comes into contact with recording medium $T_{CH}$ (°C) | Fixing member | Surface temperature of recording medium immediately before recording medium comes into contact with fixing member $T_{paper}$ (°C) | $\frac{\sqrt{\lambda_{CH}C_{CH}}\times T_{CH}+\sqrt{\lambda_{paper}C_{paper}}\times T_p}{\sqrt{\lambda_{CH}C_{CH}}+\sqrt{\lambda_{paper}C_{paper}}}$ |
|---|---|---|---|---|---|
| Example 8 | Recording medium 2 | 100 | Fixing member 3 | 70 | 98 |
| Example 9 | Recording medium 1 | 100 | Fixing member 1 | 40 | 82 |
| Example 10 | Recording medium 1 | 120 | Fixing member 1 | 60 | 102 |
| Comparative Example 1 | Recording medium 1 | 70 | Fixing member 1 | 70 | 70 |
| Comparative Example 2 | Recording medium 1 | 100 | Fixing member 1 | 25 | 78 |
| Comparative Example 3 | Recording medium 1 | 100 | Fixing member 1 | 90 | 97 |
| Comparative Example 4 | Recording medium 1 | 130 | Fixing member 1 | 70 | 112 |

TABLE 4

| | Evaluation of fastness | Evaluation of cockling resistance |
|---|---|---|
| Example 1 | A | A |
| Example 2 | A | A |
| Example 3 | B | A |
| Example 4 | A | A |
| Example 5 | A | A |
| Example 6 | A | A |
| Example 7 | A | A |
| Example 8 | A | A |
| Example 9 | B | B |
| Example 10 | A | B |
| Comparative Example 1 | C | A |
| Comparative Example 2 | C | C |
| Comparative Example 3 | C | A |
| Comparative Example 4 | C | A |

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-139404 filed Aug. 30, 2023 and No. 2024-131738 filed Aug. 8, 2024, which are hereby incorporated by reference herein in their entirety.

What is claimed is:

1. An ink jet recording method, comprising:

an ink applying step of applying an aqueous ink to an ink-absorbent recording medium by discharging the aqueous ink from an ink jet recording head;

a drying step of subjecting the recording medium to which the aqueous ink has been applied to non-contact heating to dry the aqueous ink; and a fixing step of fixing the aqueous ink on the recording medium by bringing the recording medium after the drying step into contact with a fixing member to heat the aqueous ink, wherein the aqueous ink comprises a resin particle and a wax particle, and a glass transition temperature ($T_g$(° C.)) of the resin particle, a melting point ($T_m$) of the wax particle and a surface temperature ($T_d$(° C.)) of the recording medium heated in the drying step satisfy a relationship of the following formula (1):

$$T_m > \frac{\sqrt{\lambda_{CH}C_{CH}}\times T_{CH}+\sqrt{\lambda_{paper}C_{paper}}\times T_{paper}}{\sqrt{\lambda_{CH}C_{CH}}+\sqrt{\lambda_{paper}C_{paper}}} \geq T_g > T_d \qquad \text{formula (1)}$$

where in formula (1), $\lambda_{CH}$ is a thermal conductivity (W/m·K) of the fixing member, $C_{CH}$ is a thermal capacity (J/m$^3$·K) of the fixing member, $T_{CH}$ is a surface temperature (° C.) of the fixing member immediately before the fixing member comes into contact with the recording medium, $\lambda_{paper}$ is a thermal conductivity (W/m·K) of the recording medium, $C_{paper}$ is a thermal capacity (J/m$^3$·K) of the recording medium and $T_{paper}$ is a surface temperature (° C.) of the recording medium immediately before the recording medium comes into contact with the fixing member.

2. The ink jet recording method according to claim 1, wherein $\lambda_{CH}$, $C_{CH}$, $\lambda_{paper}$ and $C_{paper}$ satisfy a relationship of the following formula (2):

$$\lambda_{CH}C_{CH} \geq \lambda_{paper}C_{paper}. \qquad \text{formula (2)}$$

3. The ink jet recording method according to claim 1, wherein $T_d$ is 40° C. or higher to 100° C. or lower.

4. The ink jet recording method according to claim 1, further comprising:

a reaction liquid applying step of applying an aqueous reaction liquid containing a reactant that reacts with the aqueous ink to a recording medium.

5. An ink jet recording apparatus for use in an ink jet recording method, wherein the method includes:

an ink applying step of applying an aqueous ink to an ink-absorbent recording medium by discharging the aqueous ink from an ink jet recording head;

a drying step of subjecting the recording medium to which the aqueous ink has been applied to non-contact heating to dry the aqueous ink; and a fixing step of fixing the aqueous ink on the recording medium by bringing the recording medium after the drying step into contact with a fixing member to heat the aqueous ink, wherein the aqueous ink comprises a resin particle and a wax particle, and a glass transition temperature ($T_g$(° C.)) of the resin particle, a melting point ($T_m$) of the wax particle and a surface temperature ($T_d$(° C.)) of the recording medium heated in the drying step satisfy a relationship of the following formula (1):

$$T_m > \frac{\sqrt{\lambda_{CH} C_{CH}} \times T_{CH} + \sqrt{\lambda_{paper} C_{paper}} \times T_{paper}}{\sqrt{\lambda_{CH} C_{CH}} + \sqrt{\lambda_{paper} C_{paper}}} \geq T_g > T_d \quad \text{formula (1)}$$

where in formula (1), $\lambda_{CH}$ is a thermal conductivity (W/m·K) of the fixing member, $C_{CH}$ is a thermal capacity (J/m$^3$·K) of the fixing member, $T_{CH}$ is a surface temperature (° C.) of the fixing member immediately before the fixing member comes into contact with the recording medium, $\lambda_{paper}$ is a thermal conductivity (W/m·K) of the recording medium, $C_{paper}$ is a thermal capacity (J/m$^3$·K) of the recording medium and $T_{paper}$ is a surface temperature (° C.) of the recording medium immediately before the recording medium comes into contact with the fixing member.

6. An aqueous ink for use in an ink jet recording method, the aqueous ink comprising:

a resin particle; and a wax particle, wherein the ink jet recording method includes:

an ink applying step of applying an aqueous ink to an ink-absorbent recording medium by discharging the aqueous ink from an ink jet recording head, a drying step of subjecting the recording medium to which the aqueous ink has been applied to non-contact heating to dry the aqueous ink, and a fixing step of fixing the aqueous ink on the recording medium by bringing the recording medium after the drying step into contact with a fixing member to heat the aqueous ink, wherein a glass transition temperature ($T_g$(° C.)) of the resin particle, a melting point ($T_m$) of the wax particle and a surface temperature ($T_d$(° C.)) of the recording medium heated in the drying step satisfy a relationship of the following formula (1):

$$T_m > \frac{\sqrt{\lambda_{CH} C_{CH}} \times T_{CH} + \sqrt{\lambda_{paper} C_{paper}} \times T_{paper}}{\sqrt{\lambda_{CH} C_{CH}} + \sqrt{\lambda_{paper} C_{paper}}} \geq T_g > T_d \quad \text{formula (1)}$$

where in formula (1), $\lambda_{CH}$ is a thermal conductivity (W/m·K) of the fixing member, $C_{CH}$ is a thermal capacity (J/m$^3$·K) of the fixing member, $T_{CH}$ is a surface temperature (° C.) of the fixing member immediately before the fixing member comes into contact with the recording medium, $\lambda_{paper}$ is a thermal conductivity (W/m·K) of the recording medium, $C_{paper}$ is a thermal capacity (J/m$^3$·K) of the recording medium and $T_{paper}$ is a surface temperature (° C.) of the recording medium immediately before the recording medium comes into contact with the fixing member.

* * * * *